United States Patent [19]
Kantorowicz

[11] 3,753,029
[45] Aug. 14, 1973

[54] CATHODE RAY TUBE INCLUDING VARIABLE DELAY MEANS

[75] Inventor: Gerard Kantorowicz, Paris, France

[73] Assignee: Thomson-CSF, Paris, France

[22] Filed: Nov. 15, 1971

[21] Appl. No.: 198,585

[30] Foreign Application Priority Data

Nov. 17, 1970 France ............................ 70/41170

[52] U.S. Cl. ........................ 315/3, 315/5.24, 313/64
[51] Int. Cl. ... H01j 23/24, H01j 29/96, H01j 29/41
[58] Field of Search ..................... 313/82 R, 82 NC; 315/3, 4, 5.24

[56] References Cited

UNITED STATES PATENTS

| | | | |
|---|---|---|---|
| 2,307,438 | 1/1943 | Whitaker | 315/3 X |
| 2,508,098 | 5/1950 | Chilowsky | 315/3 |
| 2,575,393 | 11/1951 | Peterson et al. | 315/3 X |
| 2,941,110 | 6/1960 | Yando | 315/3 |

*Primary Examiner*—Robert Segal
*Attorney*—Edwin E. Greigg

[57] ABSTRACT

The delay line comprises a piezoelectric material wafer with an input transducer for converting the electrical wave to be delayed into a mechanical one propagating along the wafer and a movable output pick-up means. This pick-up means comprises an electron beam striking the wafer and producing therefrom secondary electrons with a secondary emission coefficient greater than unity, and a two-wire line made of two plane and parallel electrodes between which the wafer is inserted, that one of the two electrodes through which the electron beam passes being a grid collecting the emitted secondary electrons. The electrical signal thus apparing between the two leads of the two-wire line is a reproduction of the high frequency input wave delayed by a time depending upon the position of the electron beam along the wafer.

2 Claims, 2 Drawing Figures

CATHODE RAY TUBE INCLUDING VARIABLE DELAY MEANS

BACKGROUND OF THE INVENTION

The present invention relates to systems for delaying a high frequency signal, and more particulary to electrically controllable delay lines.

A known means for delaying a high frequency signal is to convert it into a mechanical wave propagating at the surface of a piezolectric crystal. The signal is injected at one end of the crystal and picked up at the other end by means of transducers of known type deposited upon the surface of the crystal. The delay introduced by such a delay line into the initial signal is constituted by the transit time of the wave propagating between the two transducers. This time is constant for a particular delay line; it depends upon the crystal length between input and output transducers.

Known delay lines, slightly different from those described above, make it possible to get variable delay for the high frequency signal to be delayed, these variations being obtained by an electrical control.

In such delay lines the output transducer is not fixed; it is replaced by an electron beam pick-up device which is able to pick up the high frequency wave everywhere along the direction of propagation of the mechanical wave in the crystal. A variable delay in thus achieved which is proportional to the distance between the fixed input transducer and the pick-up output device.

Such known devices make it very difficult to secure a good reproduction of the high frequency input wave, especially if the frequency is very high.

A reason for that is that these known variable delay lines make use of piezoelectric crystal having at least one of their sides which is able to emit secondary electrons when struck by a primary electron beam. The secondary electrons thus emitted are collected by an electrode which is for example a ring collector where they give rise to a current. The intensity of this current which is proportional to the number of secondary electrons emitted is a function of the surface crystal potential at the point of impact of the primary electron beam.

Consequently, for each position of the primary beam along the direction of propagation of the high frequency wave, the collector current should reproduce said high frequency wave with a delay depending upon said beam position. Unfortunately this reproduction is not true, especially if the frequency is high and the envelope of the high frequency wave is obtained instead of the wave itself Even if the primary electron beam is very thin and if its impact zone is not so wide as the wave length of the mechanical wave propagating in the crystal, this allowing a good definition of the wave, the different initial velocities of the secondary electrons will cause a non-time-coherence upon their arrival at the collector. The result is a phase mixing for the high frequency wave collected which causes a reducing of its definition and then a destruction of the frequency information.

SUMMARY OF THE INVENTION

The principle object of the present invention is to provide a variable delay line which avoids drawback essentially by the use of a particular pick-up device for the secondary electrons which on the one hand prevents mixing of the phases at the time of electronic pick-up of secondary electrons and on the other hand contributes to deliver good high frequency current even for very high frequency waves.

According to the present invention there is provided a variable delay line for high frequency electrical wave comprising, within a sealed exhausted enclosure:

a wafer of piezoelectric material having at least one of its sides which is designed to emit secondary electrons and having secondary emission coefficient greater than unity when this side is bombarded by a primary electron beam, at one end of said wafer onto said side of said wafer, an input transducer for converting the high frequency electrical wave into a mechanical one propagating at the surface of the aforementioned side, at the other end of the wafer onto the mentioned side, an absorbing load for absorbing said mechanical wave after its propagating onto the wafer, an electron-gun producing an electron-beam for bombarding the mentioned side of the wafer onto a so-called impact zone, said electron-beam constituting the aforementioned primary electron beam, controllable deflection means for positionning the impact zone of said primary electron beam along the direction of propagation of the mechanical wave onto the wafer, and two plane and parallel electrodes between which the wafer is inserted, a first one being a conductive grid which is positively biased with regard to the electron gun and which is fixed onto, or very close to the mentioned side of the wafer, for collecting the secondary electrons emitted by the mentioned side, and the second one being a conductive plate which is fixed onto a side of the first mentioned wafer opposite to said side, the two electrodes constituting a two-wire line between two ends of which is collected a high frequency signal reproducing the high frequency electrical wave applied to the input transducer and being delayed with regard to it by a value depending upon the adjustment of the controllable deflection means.

DETAILED DESCRIPTION OF THE PREFERRED EMBODIMENTS

The ensuing description will provide a better understanding of the invention, in association with the attached figures where:

FIG. 1 illustrates the variations in the secondary electron emission coefficient $\delta$ as a function of a potential V, this phenomenon being exploited in the device in accordance with the invention.

This potential V is the one at the point of impact of the incident or "primary" electrons on a material which exhibits secondary emission; in fact it is representative of the energy of these primary electrons when striking the material. The coefficient $\delta$, as those skilled in the art will appreciate, is the ratio of a current developed by the electrons produced by secondary emission, or secondary electrons and the current produced by the primary electrons.

The dashed curve 15 illustrates the variation in the secondary electron emission coefficient of a material exposed to an electron beam, as a function of the energy of the beam represented by V. A distinguishing value of the coefficient $\delta$ is the value 1, for which the number of secondary electrons emitted is equal to the number of incident primary electrons. This value is reached at two different potentials: $V_{c1}$, a point of unstable equilibrium, and $V_{c2}$, a point of stable equilibrium.

The solid curve 25 illustrates variations in the apparent secondary electron emission coefficient of a material exhibiting this characteristic when it is in view of an electrode collecting secondary electrons; said collector electrode being formed in the delay line of the invention by a grid of the kind illustrated in FIG. 2 and described below.

The secondary emission coefficient of the curve 25 is said to be "apparent" for it takes into account the secondary electrons collected by the collector instead of the entirety of the emitted secondary electrons.

Considering the part of curve 15 which extends between $V_{c1}$ and $V_{c2}$ and where the secondary emission coefficient is greater than unity one can say that the struck material loses electrons and then becomes more and more positively charged.

Consequently some of the emitted secondary electrons fall back onto the struck surface of the material and are caught by it. The collector electrode receives fewer secondary electrons and the apparent secondary emission coefficient decreases until a stable equilibrium state is reached said coefficient being then equal to unity. That is shown by the $V_{EQ}$ abscissa point of curve 25.

Then a mechanical wave propagated onto the surface of a piezoelectric crystal block gives rise onto said surface to a potential distribution resulting from the piezoelectric effect. This potential distribution is modulated at any point of the crystal while said wave is propagating; a modulation of the number of secondary electrons emitted by said points when struck by the primary electron beam, and consequently of secondary electrons collected by the collector electrode and of apparent coefficient $\delta$ then occurs.

Figure 2:
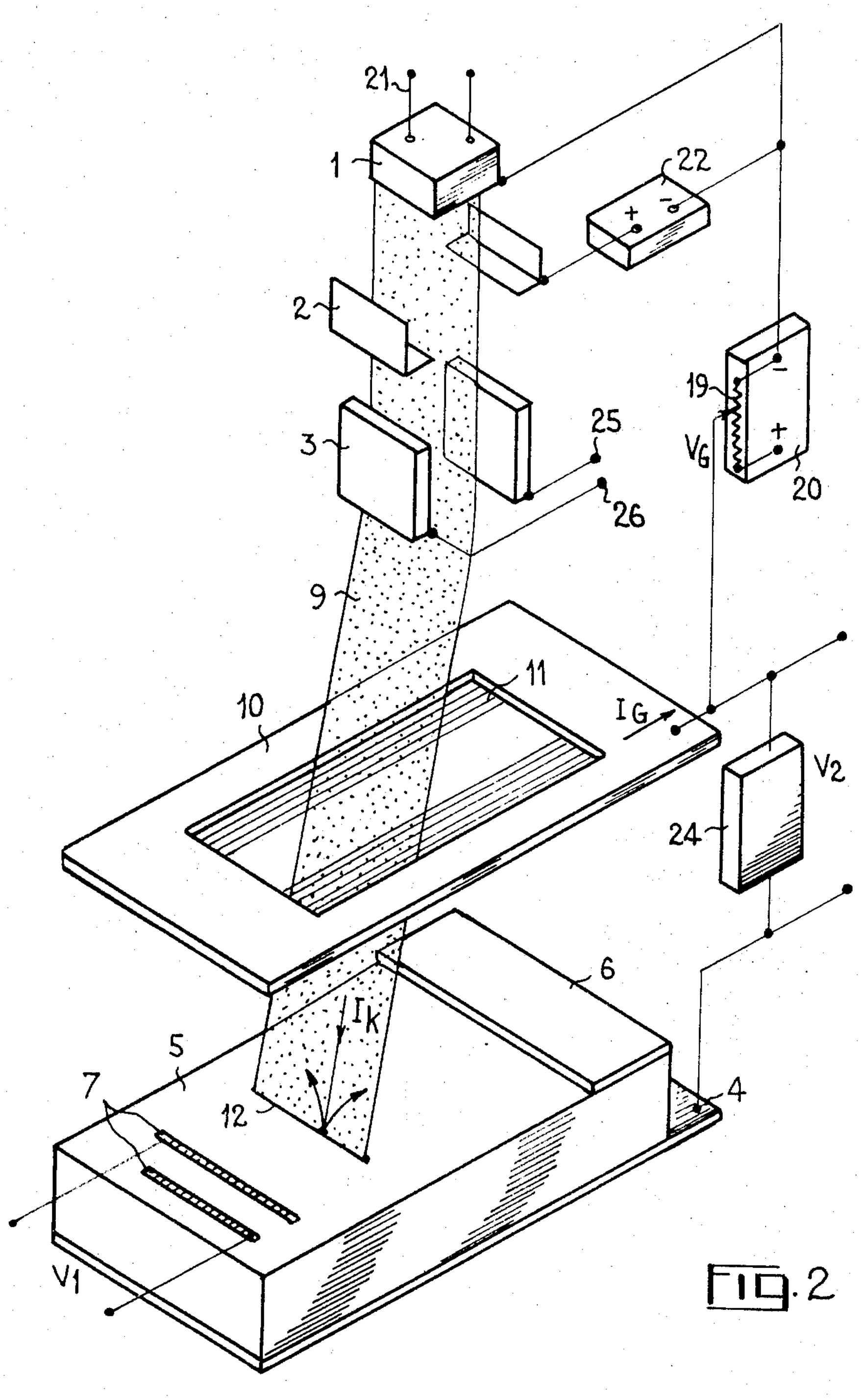
FIG. 2 illustrates a schematic exploded view of an embodiment of a variable delay line in accordance with the invention.

FIG. 2 illustrates a schematic exploded view of the most important elements of a delay line according to the invention and of its biasing means.

The delay line is contained within a sealed exhausted enclosure (not shown).

It comprises a wafer 5 of a piezoelectric material, for example a quartz crystal which has been cut in a direction which gives a good electromechanical coupling coefficient. This wafer 5 may be itself able to emit secondary electrons. It also may be covered with a layer of a material having a $\delta$ coefficient in excess of that of the piezolectric material, for example a layer of magnesium fluoride.

The wafer 5 is covered at one of its ends by a material 6 such for example as a polycrystalline titanium ceramic, which constitutes an absorbing load avoiding parasitic reflections of mechanical waves propagating at the suface of the wafer.

At the other end, the wafer 5 is equipped with a system of two electrodes 7 constituting a known type of transducer for converting a high frequency signal $V_1$ to be delayed into a mechanical wave, the transducer for example taking the form of two interleaved comb-like structures spaced at half a mechanical wavelength of the high frequency signal.

The wafer 5 is bombarded by a primary electron beam 9 onto its face where the mechanical wave is propagating. The primary electron beam 9 is emitted by a known type electron-gun. This electron-gun comprises for example an electron emissive cathode 1, with two terminals 21 designed to apply a heating voltage in the case of a thermoionic cathode, an anode 2 which is positively biased by means for example of a voltage source 22 the negative terminal of which is connected to the cathode and is used as a reference potential and deflection electrodes 3 controlled in a classical, conventional manner by means of terminals 25 and 26.

This electron gun emits a primary electron beam 9. The position of its impact zone 12 along the direction of propagation of the mechanical wave in the wafer 5 is controlled by the electric signal applied between the terminals 25 and 26 of the electrodes 3.

The crystal wafer 5 is enclosed between two parallel electrodes 10 and 4 which constitute a two-wire line extracting, from the wafer 5, the delayed high frequency wave.

A first lead from the two wire line is from the electrode 10, a grid, and is of condctive material maintained at a $V_G$ potential which is positive vis-a-vis that one of the cathode 1, for example by means of a voltage source 20 adjustable by means of a rheostat 19. This grid 10 is placed very close to the upper surface of the wafer 5. It even may be set on it. In such a case, means are provided for electrically insulating the two ends of the wafer 5 from the grid 10.

The second lead of the two-wire line is a plate 4 made of a conductive material attached to the lower surface of the wafer 5.

The delayed high frequency signal is extracted by leads attached to the grid 10 and the plate 4, for example in the form of a potential $V_2$ created between the terminals of an external load 24 connected between these two leads.

Figure 1:
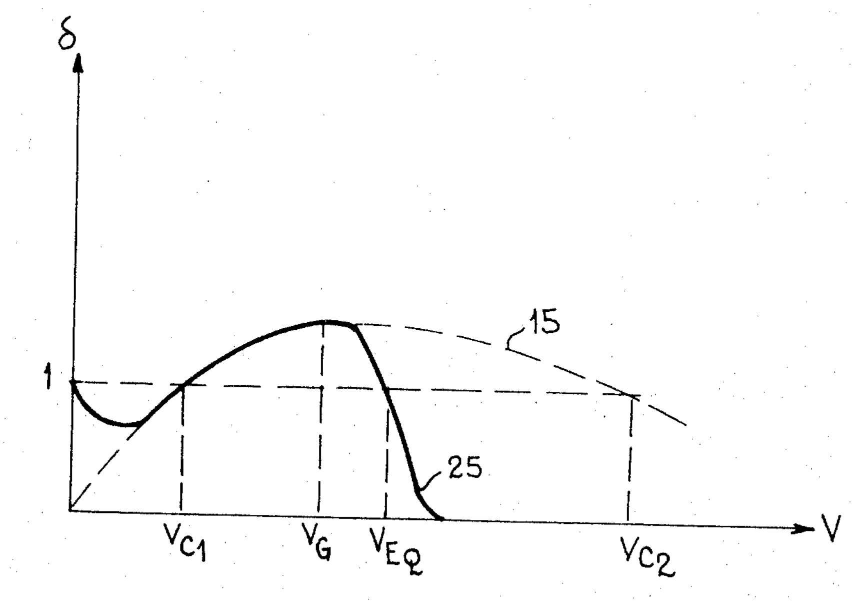
FIG. 1 shows known graphs illustrating variations in the secondary electron emission coefficient of a crystal for example as a function of the energy of the primary electrons striking it.

The grid 10 which is partly equivalent to the collector electrode earlier mentioned is biased at a $V_G$ potential (see FIG. 1) which corresponds to a secondary emission coefficient $\delta$ greater than unity, thus increasing the sensibility of the delay line, i.e. the ratio of the output signal to the input one.

For the same reasons, the wafer 5, the transducer 7 and the impact zone 12 of the beam 9 are wide. The grid 10 is so made that its part which is transparent to the beam 9 is at least as wide as said beam, said part being constituted here by parallel conductive wires 11 electrically connected to the peripherical part of the grid 10.

These wires 11 are advantageously disposed parallel to the direction of propagation of the mechanical wave excited in the wafer 5 in such a way that they do not greatly disturb the bombardment of each successive impact zone 12 by the beam 9, these zones being very thin. The electron beam 9 has indeed a very small thickness for providing an impact zone 12 having a thickness, parallel to the direction of propagation of the mechanical wave, much smaller than the wavelength of said wave, this allowing the restitution of a better quality high frequency delayed signal.

In the absence of a voltage across the terminals of the electrodes 7, the zone of impact 12 of the electron beam 9 on the wafer 5 is at an equilibrium potential $V_{EQ}$ slightly in excess of $V_G$. The apparent secondary electron emission coefficient $\delta$ is then equal to 1. The secondary electrons are collected by the grid 10 in which they develop a current $I_G$ substantially equal to the current $I_K$ coming from the cathode 1.

When a high frequency signal $V_1$ is injected between the electrodes 7 the current $I_G$ is modulated at the frequency of the signal $V_1$.

The grid 10 and the plate 4 which constitute the two-wire line take this current to the terminals of the load 24 where the modulation of $I_G$ is converted into the voltage $V_2$ reconstituting the input signal $V_1$.

Thus, the signal $V_2$ is identical to the signal $V_1$ transformed by the transducer but is delayed in relation thereto by a time proportional to the distance covered by the wave train between the electrodes 7 at which $V_1$ is received, and the zone of impact 12 where the signal is recovered. This zone of impact of the electron beam 9 on the piezoelectric wafer 5, can easily be displaced parallel to itself, by the variation of the voltage applied to the terminals 25 and 26 of the deflection electrodes 3.

The main and new advantages of such delay lines chiefly result of the use of a two-wire line for extracting the delayed high frequency signal. Such a use makes possible the delaying of very high frequency waves, a two-wire line being better suitable for the transmission of very high frequency currents than a single lead.

They also result from the use of the grid 10 situated at a very small distance from the bombarded surface of the wafer, or even onto this surface, instead of a common collector electrode, a ring one for example.

As a matter of fact, the secondary electrons are emitted with initial speeds which are different as concerning their value as well as their direction. It is quite essential to collect them at a distance of their emission point which is the smallest possible to avoid the phase mixing which generally occurs with classical collector electrodes.

These two features have the effect of enabling the initial high frequency signal itself, and not merely its envelope, to be recovered, even for very high frequency signals.

The device in accordance with the invention, by way of example, has produced delays varying from several tens of nanoseconds to some few microseconds at frequencies in the order of 1 gc/s.

It can advantageously be used in the field of signal recognition as employed in radar applications.

Of course, the invention is not limitated to the embodiments described and shown which were given solely by way of example.

What is claimed is:

1. A cathode ray tube including variable delay means for a high frequency electrical wave comprising, within a sealed exhausted enclosure:

an elongated wafer of piezolectric material having at least one of its sides designed to emit secondary electrons with a secondary emission coefficient greater than unity when said side is bombarded by a primary electron beam, an input transducer positioned on said side of said wafer in the vicinity of one end thereof for converting said high frequency electrical wave into a mechanical one, said mechanical wave propagating along the surface of said side from said one end of said wafer to its other end, an absorbing load positioned on said side of said wafer in the vicinity of said other end for absorbing said mechanical wave after its propagation along said wafer, means including an electron gun for generating a flat electron beam at least equal to the width of said input transducer for bombarding an impact zone on said side of said wafer, controllable deflection means for adjustably positioning said primary electron beam so that said impact zone may be moved along the propagation direction of said mechanical wave along said wafer, and two plane and parallel electrodes between which said wafer is inserted, a first one being a conductive grid which is positively biased with regard to said electron gun and which is fixed sufficiently close to said side of said wafer for collecting the secondary electrons emitted by said side without substantial phase mixing and which consists of conductive wires parallel to the direction of propagation of said mechanical wave, their number, their thickness and their spacing being such that said grid does not obstruct the primary electron beams and that the secondary electrons are yet collected by said grid, and the second one being a conductive plate which is fixed onto a side of said wafer opposite to said side, said two electrodes constituting a two-wire line between two ends of which is collected a high frequency signal reproducing the high frequency electrical wave applied to said input transducer and being delayed with regard to it by a value depending upon the adjustment of said controllable deflection means.

2. A cathode ray tube according to claim 1, wherein a load is connected between said two ends of said two-wire line, said delayed high frequency wave appearing as a varying potential between the terminals of said load.

* * * * *